United States Patent [19]

Hurlburt

[11] Patent Number: 5,447,320
[45] Date of Patent: Sep. 5, 1995

[54] STEERING MECHANISM FOR COMPACT TRACTORS

[75] Inventor: Joseph C. Hurlburt, Lancaster, Pa.

[73] Assignee: New Holland North America, Inc., New Holland, Pa.

[21] Appl. No.: 273,081

[22] Filed: Jul. 8, 1994

[51] Int. Cl.$^6$ .......................... B62D 5/26; B62D 7/16
[52] U.S. Cl. .................... 280/97; 280/109; 280/117; 180/266; 180/79.4
[58] Field of Search ............... 280/93, 95.1, 97, 98, 280/103, 109, 111, 113, 114, 116, 117, 125, 126, 127, 130, 132, 133; 180/79, 79.3, 79.4, 266, 267, 234, 144, 155, 156, 53.7, 53.1

[56] References Cited

U.S. PATENT DOCUMENTS

| 3,027,963 | 4/1962 | Nicholson | 280/97 |
| 3,370,670 | 2/1968 | Love | 280/111 |
| 5,046,577 | 9/1991 | Hurlburt | 280/97 |
| 5,219,180 | 6/1993 | Zipser et al. | 280/759 |

FOREIGN PATENT DOCUMENTS 0006170  1/1984  Japan ..................... 180/144
0007545  8/1989  WIPO ..................... 280/97

Primary Examiner—Margaret A. Focarino
Assistant Examiner—Peter C. English
Attorney, Agent, or Firm—Larry W. Miller; Frank A. Seemar

[57] ABSTRACT

A compound steering mechanism for improving the turning radius of a compact tractor is disclosed wherein the front axle is pivotally mounted to the tractor chassis by upper and lower pivot joints, the lower pivot joint being transversely swingable relative to the upper pivot to accommodate a vertical oscillation of the steerable wheels mounted to the front axle. A support link mounts the lower pivot joint and fixes the longitudinal spacing thereof relative to a rear pivot joint. The lower pivot joint and the front axle oscillate about an oscillation axis passing through the upper and rear pivot joints. The front axle pivots in the direction of steering in response to the steering movement of the steerable wheels as a result of the connection of a respective tie rod interconnecting the chassis and each of the steerable wheels.

5 Claims, 10 Drawing Sheets

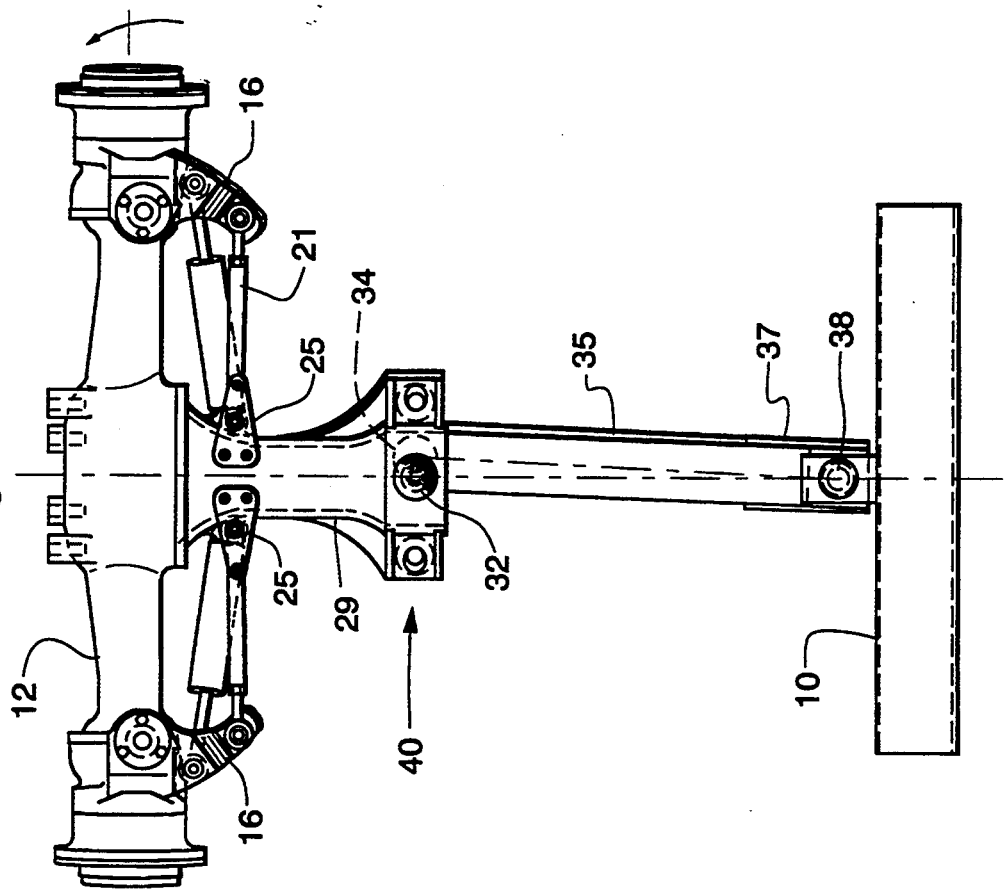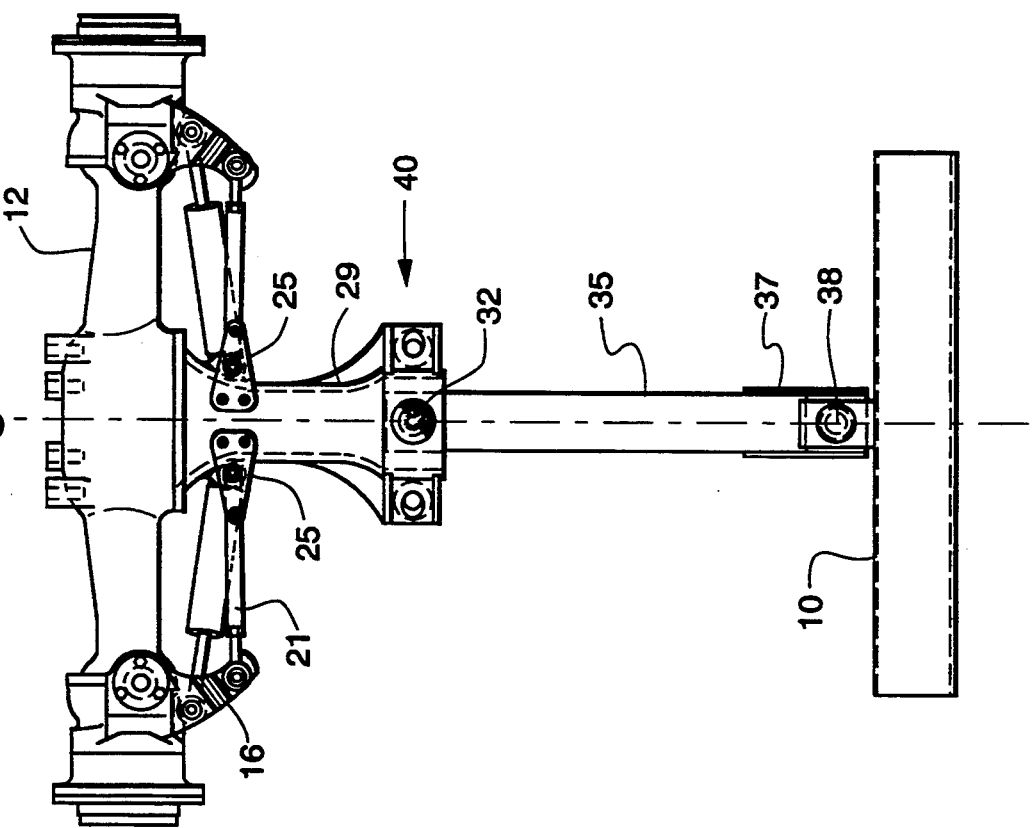

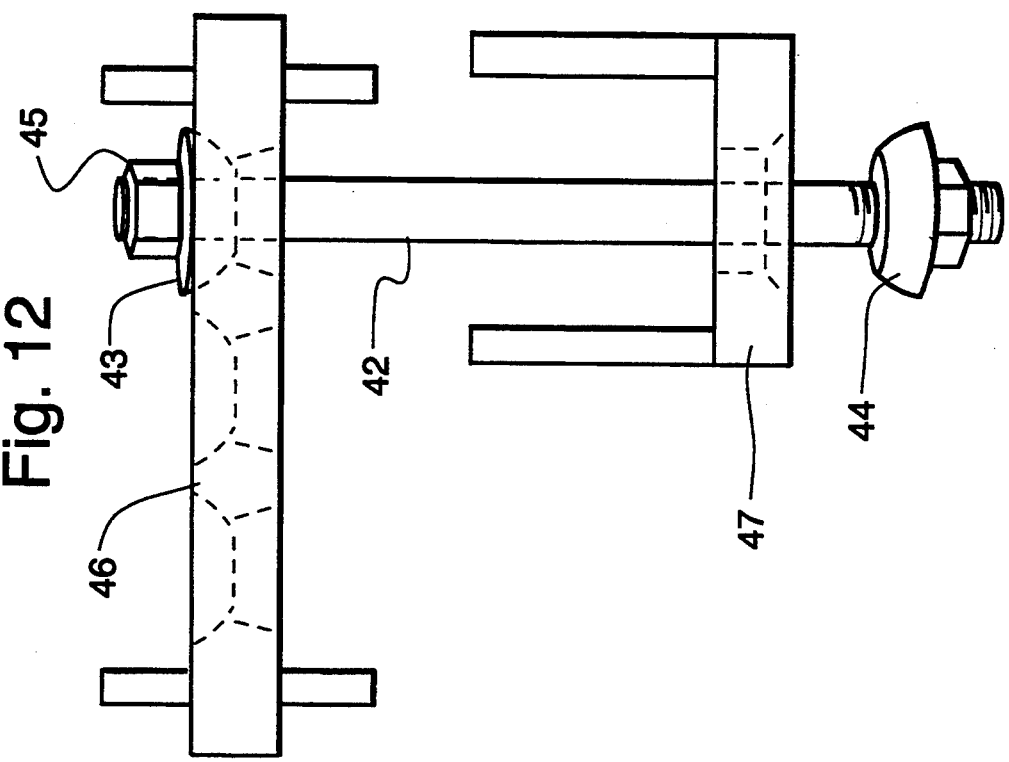
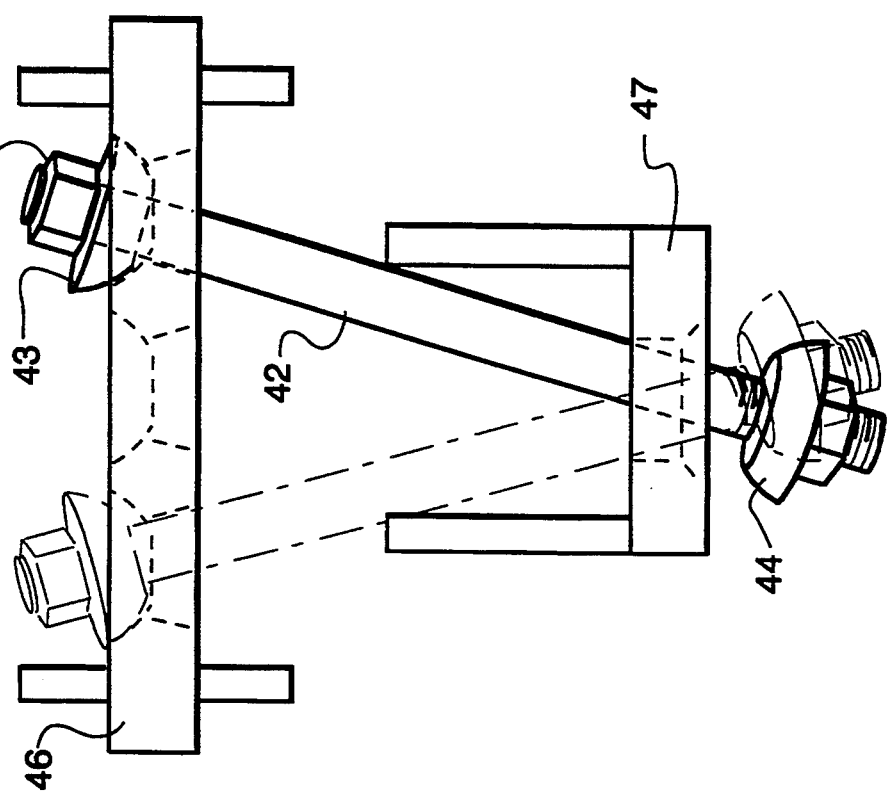

STEERING MECHANISM FOR COMPACT TRACTORS

BACKGROUND OF THE INVENTION

This invention relates generally to off-road motor vehicles, such as tractors, and more particularly, to a steering mechanism permitting a decreased turning radius for the tractor.

Tractors, whether used in an agricultural setting or in an industrial setting, typically include a fixed axle through which primary driving power is transferred through fixed wheels rotatably mounted on opposing ends of the fixed axle, and a steering axle having pivotally mounted steerable ground engaging wheels rotatably mounted on the opposing ends thereof to support the chassis of the tractor above the ground. Although supplemental driving power is often provided to the steerable ground engaging wheels, a steering mechanism remotely controllable by the operator from the operator's compartment selectively controls the pivotal movement of the steerable wheels relative to the steering axle.

One such steering mechanism incorporates a transversely disposed, horizontally extending hydraulic cylinder supported by the steering axle and connected to the opposing steerable wheels. This hydraulic cylinder affects pivotal movement of the steerable wheels about their respective pivotal connections to the steering axle by manipulating the pressures in the hydraulic cylinder to effect a transverse extension of cylinder rod, causing a turning of the wheels.

Due to physical limitations relating to the range of movement of the steering mechanism and to the eventual interference between the steerable wheels and the chassis or the steering axle, the amount of pivotal movement of the steerable wheels relative to the steering axle is limited to a given turning angle. This maximum turning angle defines the minimum turning radius of the tractor for a given wheel base length and tread spacing. The selection of the length of the wheel base, i.e., the distance between the fixed axle and the steering axle, is a compromise between the need to minimize the turning radius and, therefore, minimize the wheel base length, and to maximize ride considerations which require longer wheel base lengths.

Because of the size and orientation of the axle support and oscillation components, known compound steering mechanisms, such as found in U.S. Pat. No. 5,297,648, granted on Mar. 29, 1994, to C. A. Hansen and J. C. Hurlburt, are not well suited for small tractors, particularly when front hitch and front PTO applications are desired. Economy is also a major concern with small tractors as the incremental cost of providing a compound steering mechanism becomes a greater percentage of the overall cost of the small tractor. By providing a compact pivotal support for the steerable axle and an oscillation stop package immediately behind the front axle, a front-mounted attachment could be brought closer to the axle and economies maintained.

SUMMARY OF THE INVENTION

It is an object of this invention to overcome the aforementioned disadvantages of the prior art by providing a compound steering mechanism for use on a compact tractor in which the pivot support for the front axle and the oscillation stop mechanism are positioned immediately behind the front axle.

It is a feature of this invention that the compound steering mechanism affects a simultaneous pivoting of the ground engaging wheels relative to the steering axle and a pivotal movement of the steering axle relative to the chassis.

It is an advantage of this invention that the turning radius for a given tractor wheel base length can be decreased.

It is another feature of this invention that the steering axle is pivotally supported relative to the chassis by a pivot mechanism that is coupled to the steering mechanism for affecting a simultaneous pivotal movement of the steering axle relative to the chassis.

It is another object of this invention to provide a compact compound steering design that can be adapted for small tractors.

It is still another object of this invention to locate the oscillation stop system behind the front axle to compliment the compact design of the pivotal support for the front axle.

It is yet another object of this invention to provide a pivot mechanism pivotally supporting the steering axle relative to the chassis of the vehicle to enable a pivotal movement of the steering axle about a generally vertical axis, as well as a oscillation of the steering axle in response to ground undulations about a longitudinally extending, generally horizontal axis relative to the chassis.

It is a primary object of this invention to provide a compound steering configuration that can be structurally and economically adapted to small tractors.

It is still another feature of this invention that the pivot mechanism connecting the front axle to the tractor chassis includes a lower pivot joint that is mounted for transverse swinging movement relative to an upper pivot joint to accommodate oscillatory movement of the front axle.

It is yet another feature of this invention that the linkage mounting the front axle to the tractor chassis includes a link for supporting the lower pivot joint and retaining the front axle in a cantilever manner from the steering pivot apparatus mounted from the tractor chassis.

It is another advantage of this invention that the support link is centrally located and can be configured to shield a drive shaft providing operative driving power to the front wheels.

It is still another advantage of this invention that the configuration of the compound steering mechanism is compatible with front axle mounted front weights, front hitch and front PTO applications.

It is yet another advantage of this invention that the compound steering mechanism provides improvement to the maneuverability of small tractors.

It is a further feature of this invention that the oscillation axis is elevated to increase tractor stability.

It is a further object of this invention to provide a compound steering mechanism that can be economically manufactured so as to minimize the incremental cost of providing such a steering mechanism for small, compact tractors.

It is a further object of this invention to provide a steering mechanism for compact tractors which is durable in construction, inexpensive of manufacture, carefree of maintenance, facile in assemblage, and simple and effective in use.

These and other objects, features, and advantages are accomplished according to the instant invention by providing a compound steering mechanism for improving the turning radius of a compact tractor wherein the front axle is pivotally mounted to the tractor chassis by upper and lower pivot joints, the lower pivot joint being transversely swingable relative to the upper pivot to accommodate a vertical oscillation of the steerable wheels mounted to the front axle. A support link mounts the lower pivot joint and fixes the longitudinal spacing thereof relative to a rear pivot joint. The lower pivot joint and the front axle oscillate about an oscillation axis passing through the upper and rear pivot joints. The front axle pivots in the direction of steering in response to the steering movement of the steerable wheels as a result of the connection of a respective tie rod interconnecting the chassis and each of the steerable wheels.

BRIEF DESCRIPTION OF THE DRAWINGS

The advantages of this invention will be apparent upon consideration of the following detailed disclosure of the invention, especially when taken in conjunction with the accompanying drawings wherein:

FIG. 8A is a schematic top plan view corresponding to the view of FIG. 7 with the steering component effecting a straight ahead operation;

FIG. 8B is a schematic top plan view similar to that of FIG. 8A, except that the right steerable wheel has been elevated to show the effect of front axle oscillation on the lower pivot and support link;

FIG. 11 is an enlarged schematic elevational view of the left oscillation stop mechanism depicting an alternative configuration of the stop link when in the straight ahead, non-turning orientation, an oppositely mounted stop link being shown in phantom; and FIG. 12 is an enlarged schematic view similar to that of FIG. 11, except that the steerable axle has undertaken pivotal movement relative to the chassis during a left turning operation.

DETAILED DESCRIPTION OF THE PREFERRED EMBODIMENT

Figure 1:
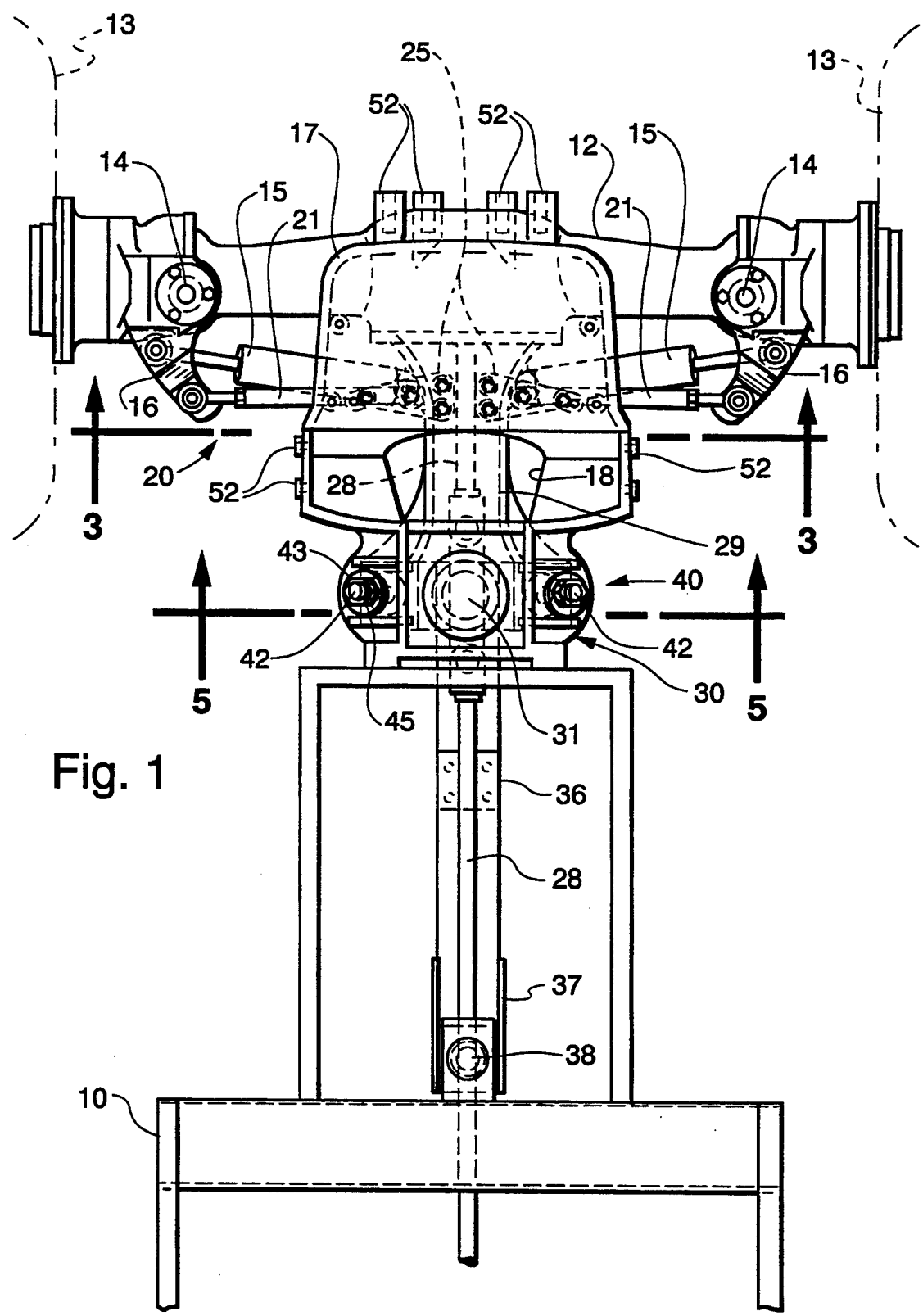
FIG. 1 is a fragmentary top plan view of the steering axle incorporating the principles of the instant invention, located at the forward portion of a tractor chassis, the tie rod mounting plates being oriented in their inboardmost position.

Referring now to the drawings and, particularly, to FIGS. 1-4, a compound steering mechanism incorporating the principles of the instant invention and being designed for incorporation into small, compact tractors can best be seen. The tractor chassis 10 consists of a conventional wheeled frame supported by front and rear axles having ground engaging wheels attached thereto. The chassis 10 is representatively shown throughout all of the drawings. One skilled in the art will readily recognize that the chassis 10 can also consist of a conventional "buckle-up" design in which the front axle is bolted to the engine E, which is bolted to the transmission, which is bolted to the rear axle assembly, etc., without the benefit of a formal frame structure supporting all of these components. In the drawings, only the front steerable axle 12 and the forward portion of the representative chassis 10 are depicted.

The front steerable wheels 13 mounted on the opposing ends of the front axle 12 are pivotally connected to the axle 12 in a generally conventional manner so as to pivot about a king pin 14 relative to the front axle 12 to effect a steering or turning of the tractor T. The front wheels 13 can be mounted in a plurality of positions to vary the spacing between the opposing front wheels for different row crop spacings. Hydraulic steering cylinders 15 interconnect the front axle 12 with respective steering arms 16 extending rearwardly from the wheels 13 to control the pivotal steering movement thereof. The chassis 10 includes a front chassis member 17 that projects forwardly in a cantilevered manner, whether fastened to the main chassis frame 10 as depicted in the drawings or fastened to the engine block in a conventional "buckle-up" chassis design, to provide support for a radiator or other tractor or engine components.

The steering mechanism 20 includes a pair of tie rods 21 pivotally connected to the respective steering arms 16 and extending inwardly therefrom to a pivotal connection with the front chassis member 17, which is provided with a plurality of bosses 19 terminating in a common plane. A detachable triangular mounting plate 25 supports a pivotal connection for the inboard end 22 of each respective tie rod 21. The mounting plates 25 are attachable to a corresponding set of bosses 19 to fix the inboard ends 22 of the tie rods 21 to the chassis 10. As will be described in greater detail below, the mounting plates 25 can be selectively mounted on alternative sets of bosses 19 to locate the inboard ends 22 of the tie rods 21 closer or further away from the longitudinal centerline of the tractor T.

The front axle 12 has a rearwardly extending trumpet portion 29 connected to the front chassis member 17 by a steering pivot mechanism 30 defining a steering axis 31 about which the front axle 12 pivotally moves. The pivot mechanism 30 includes an upper pivot joint 32, preferably in the form of a spherical or ball joint to provide for proper swinging movement of the steering axis 31, as will be described in greater detail below. The upper pivot joint 32 is fixed in the front chassis member 17.

The steering pivot mechanism 30 further includes a lower pivot joint 34 mounted in the trumpet portion 29 and connected to a support link 35 extending forwardly from a rearward pivot joint 38 mounted in a fixed location on the chassis 10. Both the lower and rearward pivot joints 34, 38 are preferably spherical joints to allow a multi-directional freedom of movement. During oscillation movements described in greater detail below, the lower pivot joint 34 will swing laterally relative to the upper pivot joint 32. The use of spherical joints at each of the pivots 32, 34, 38 will accommodate this oscillatory movement.

Figure 4:
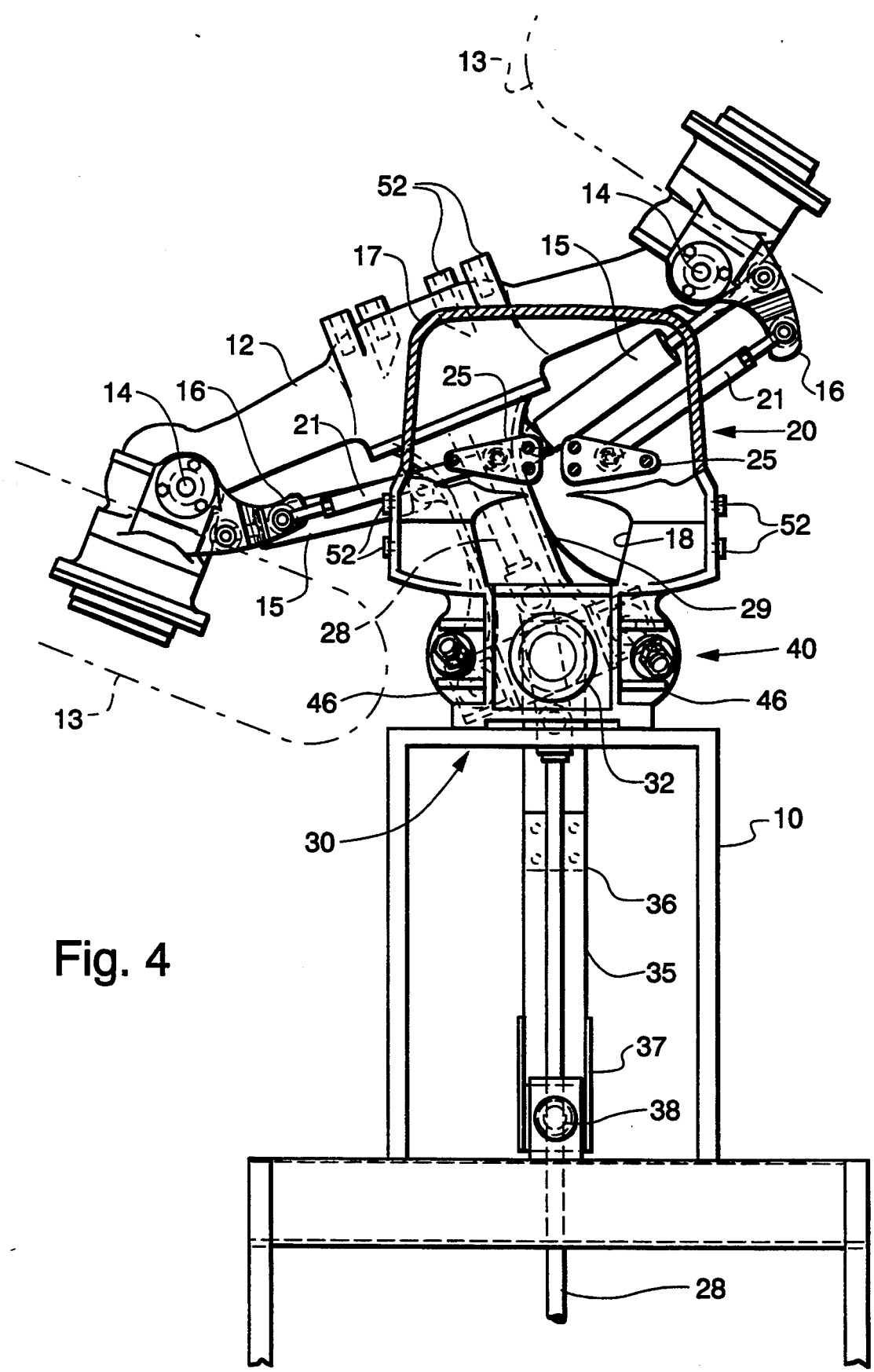
FIG. 4 is a partial top plan view of the steering axle similar to that of FIG. 1 with the steerable ground wheels being pivoted along with the steering axle into a maximum left turn position, the ground wheels are shown in an innermost mounted position to reflect the maximum inboard position of the ground wheels, the forward portion of the front chassis member being broken away to better show the steering mechanism, the tie rod mounting plates being oriented in their inboardmost position.

One skilled in the art will readily recognize that the distance between the upper and lower pivots 32, 34 is fixed as both pivots 32, 34 are mounted to the trumpet portion 29. Likewise, the distance between the upper and rearward pivots 32, 38 is also fixed as both pivots 32, 38 are mounted to the chassis 10. The three pivots 32, 34, 38 form a "journaling triangle" to provide great flexibility in the freedom of movement of the front axle 12 in both steering and oscillation actions. To accommodate the position of the inboard front wheel 13 when located in its innermost position and undergoing a severe turning angle, as depicted in FIG. 4, the front chassis member 17 is recessed in the area of the steering pivot mechanism 30.

Figure 7:
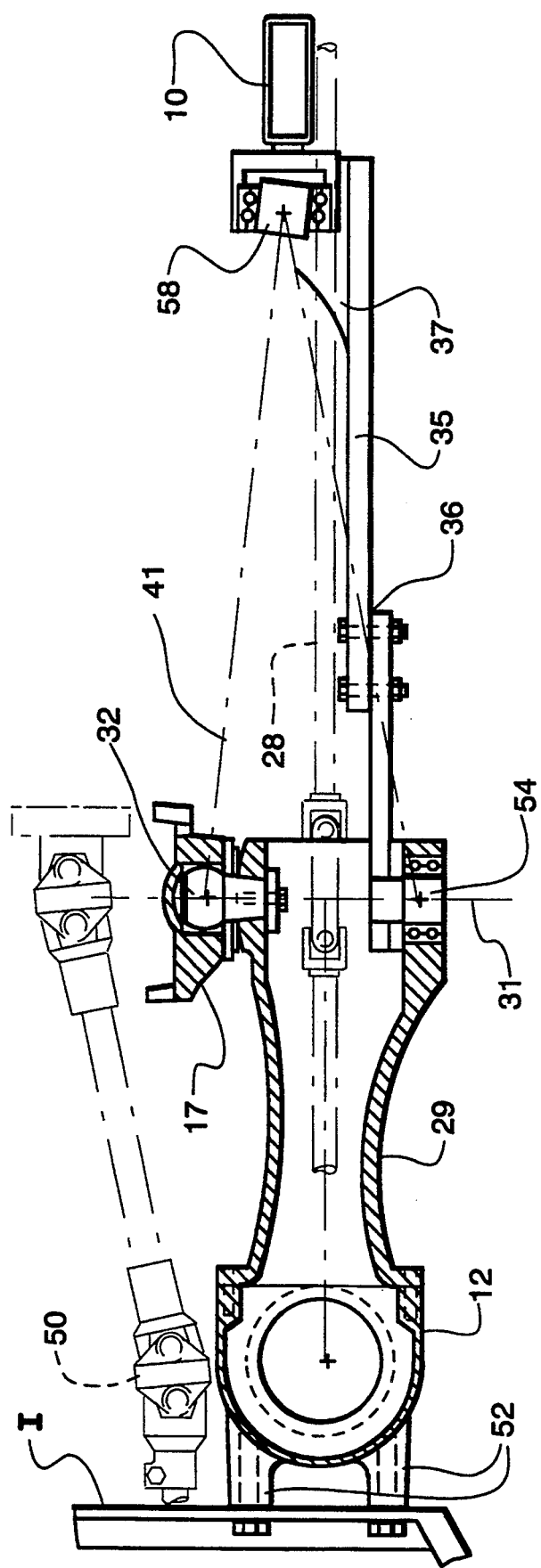
FIG. 7 is a schematic cross-sectional view showing a side elevation of an alternate pivot mechanism connecting the front axle to the tractor chassis to best show the steering axis, the oscillation axis and the effective tension axis of the support link, the PTO shaft and the front wheel drive shaft being shown in phantom, a front mounted implement being mounted to the steerable axle and broken away to better show the details of the alternate pivot mechanism.

To facilitate assembly, the support link 35 is constructed as a two-piece device with a bolted joint 36 therebetween. At the connection with the rearward pivot 38, the support link 35 includes a U-shaped bracket 37 to allow the passage of a drive shaft 28 through the bracket 37 to connect with the front axle 12 to provide operative rotational power thereto. From the bracket 37 forwardly, the drive shaft 28 is shielded from below by the support link 35 as the drive shaft 28 passes between the support link 35 and the chassis 10. As best seen in FIG. 7, one skilled in the art will recognize that the bolted joint 36 is located along an effective line of force passing between the lower and rearward pivots 34, 38 to minimize the forces on the fasteners connecting the bolted joint 36, as well as the fasteners retaining the pivot joints 34, 38.

As can be best seen in FIGS. 1–8B, an oscillation stop mechanism 40 is provided to limit the vertical rolling oscillation of the front axle 12. As representatively depicted in FIG. 6, the front axle 12 and trumpet portion 29 undergo a vertical rolling oscillation in response to undulations in the ground G, whenever one of the front wheels 13 becomes elevated, so that the chassis 10 can remain generally level. This rolling oscillatory movement of the front axle 12 is accommodated within the steering pivot mechanism 30 as the lower pivot joint 34 is free to swing laterally via the pivotal connection of the support link 35 through the rearward pivot 38.

The purpose of the support link 35 is primarily to maintain the predetermined spacing between the rearward pivot 38 and the lower pivot 34, while allowing the lateral swinging movement of the lower pivot 34. Since the upper pivot 32 is a spherical joint, the steering axis 31 undergoes a corresponding movement remaining aligned with the fixed upper pivot 32 and the swingable lower pivot 34. Referring specifically to FIGS. 8A and 8B, the lower pivot 34 and, therefore, the front axle 12 rotate about an oscillation axis 41, corresponding to a line passing through the upper pivot 34 and the rearward pivot 38.

The oscillation stop mechanism 40 provides a limit to the amount of rolling oscillatory movement permitted to the front axle 12 to prevent interference between various tractor components. The oscillation stop mechanism 40 includes a pair of laterally spaced stop links 42 positioned, respectively, on opposing sides of the steering pivot mechanism 30. Each stop link 42 passes through an upper bracket 46 formed as part of the front chassis member 17 and through a lower bracket 47 formed as part of the trumpet portion 29 of the front axle 12. Each stop link 42 has an upper and lower cupped flange 43, 44 having a curved surface engageable with a seat formed in the corresponding bracket 46, 47. One of the flanges 43, 44 is operatively engaged with an adjustment mechanism 45 to position that flange 43, 44 along the length of the stop link 42 and, thereby, selectively vary the distance between the upper and lower flanges 43, 44 to control the amount of rolling oscillation permitted the front axle 12. For ease of access, the upper flange 43 is preferably positionally adjustable.

Figure 5:
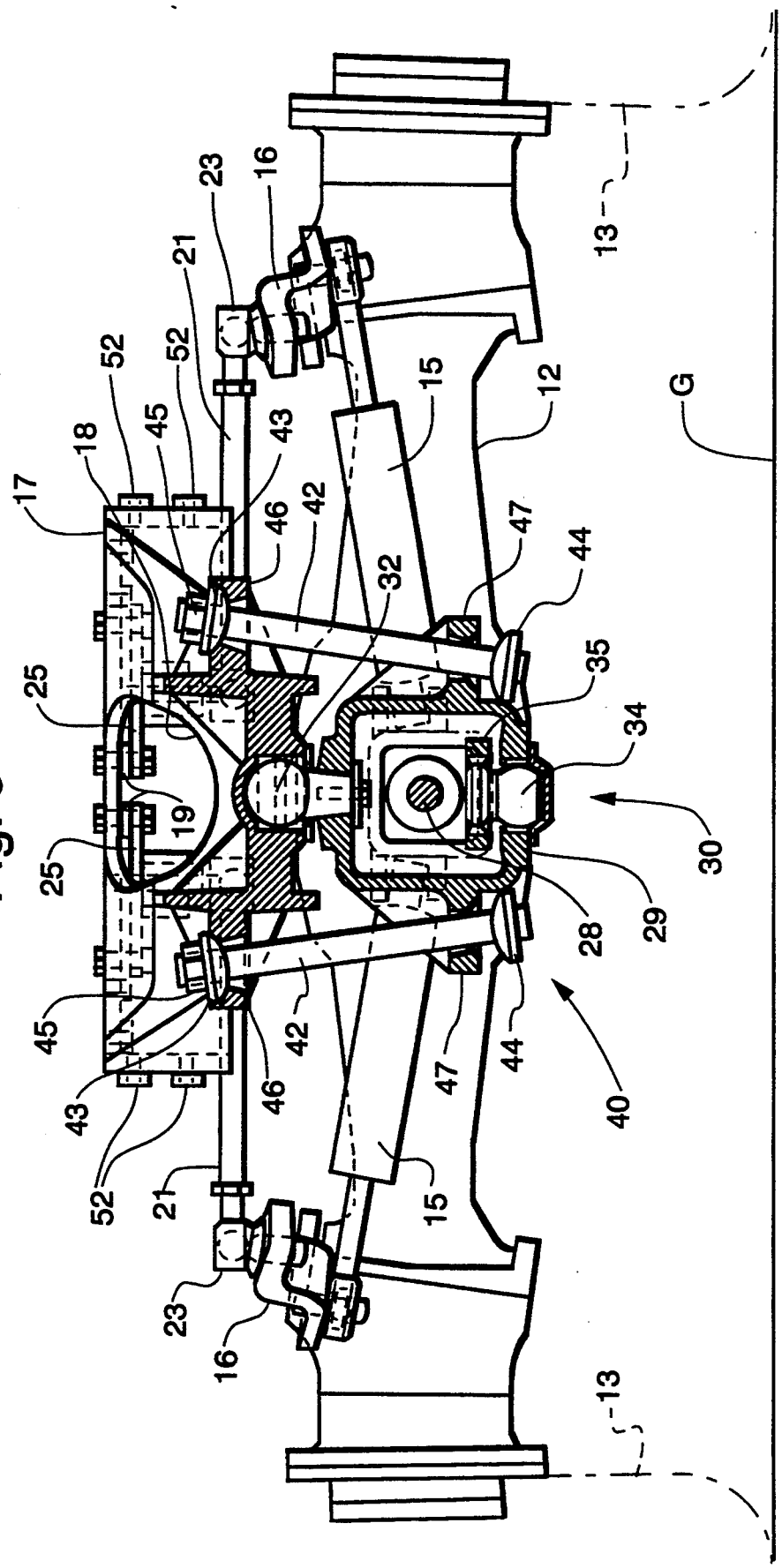
FIG. 5 is a cross-sectional view taken along lines 5—5 of FIG. 1 to better show the oscillation stop mechanism and the upper and lower pivot joints forming a part of the pivot mechanism mounting the front axle to the tractor chassis.
Figure 6:
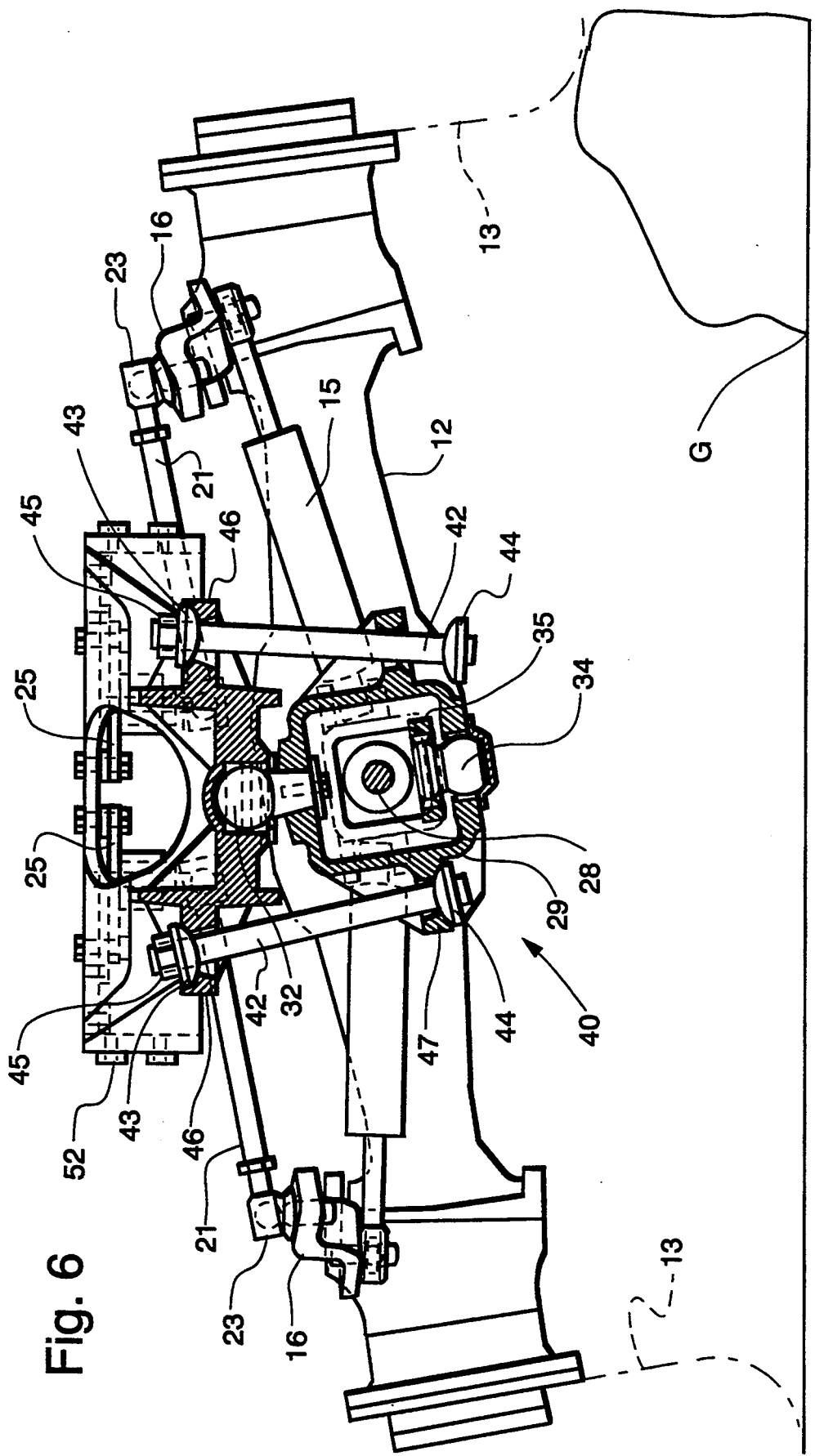
FIG. 6 is a cross-sectional view similar to that of FIG. 5, except that the right steerable wheel has vertically moved relative to the opposing steerable wheel sufficiently to engage the corresponding oscillation stop link.

The normal operating distance between the upper and lower flanges 43, 44 is greater that the vertical distance between the upper and lower brackets 46, 47, as is best seen in FIG. 5. Whenever one of the front wheels 13 rises in elevation relative to the other front wheel 13, as representatively demonstrated in FIG. 6, the front axle 12 pivots about the oscillation axis 41 causing the upper and lower brackets 46, 47 corresponding to the front wheel 13 that is lower in elevation to separate a greater distance than the normal operating distance. At the point at which maximum desired rolling oscillation is reached, the bottom bracket 47 bottoms out against the lower flange 44.

As a result, the stop link 42 then stops any further pivotal movement of the front axle 12 about the oscillation axis 41 and any further increases in elevation of the higher wheel will be transferred directly to the chassis 10. The oscillation stop mechanism 40 also operates to limit the rolling oscillation of the front axle 12 while steering. Since the lower brackets 47 move in a fore-and-aft direction when the front axle 12 pivots about the upper pivot joint 32, the effective distance between the upper and lower brackets 46, 47 increases as the front axle 12 pivots as part of the steering action, which in turn decreases the amount of rolling oscillation permitted the front axle 12.

One skilled in the art will readily realize that the manipulation of the adjustment mechanism 45 to reposition the upper flange 43 relative to the lower flange 44 will result in a variation of the amount of rolling oscillation permitted to the front axle 12 relative to the chassis 10. One skilled in the art will also recognize, as depicted in FIGS. 11 and 12, that a re-positioning of the stop link 42 relative to the upper and/or lower brackets 46, 47, such as within alternate mounting seats in the upper bracket 46, or an actual re-positioning of the upper and/or lower brackets 46, 47 to move the stop link 42 in a fore-and-aft direction will also change the operational characteristics of the oscillation stop mechanism 40 as a function of the steering angle.

Figure 2:
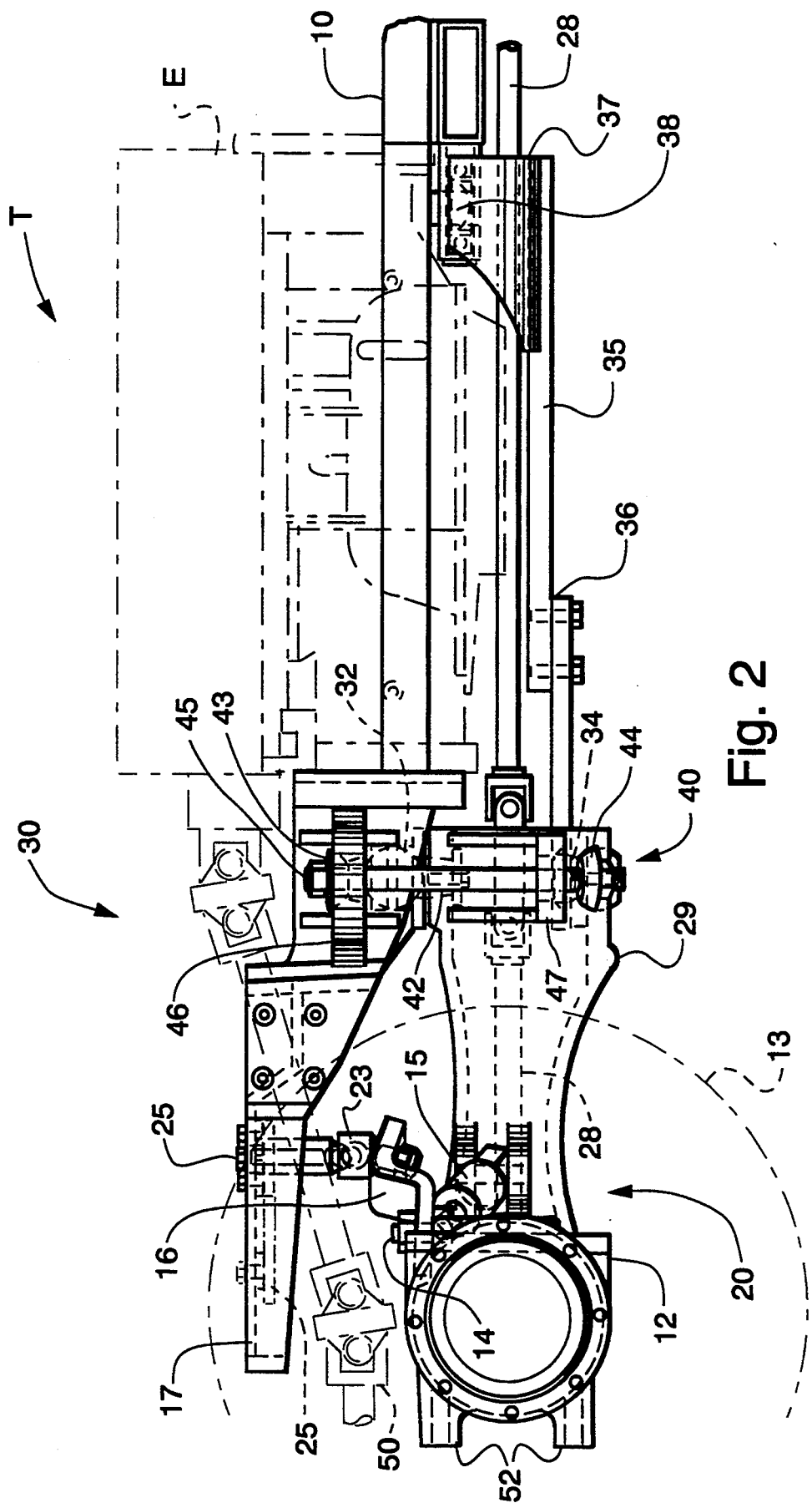
FIG. 2 is a side elevational view of the steering mechanism shown in FIG. 1, a representative engine, front PTO shaft and front steerable wheels being shown in phantom, a tie rod mounting plate oriented in its outboardmost position also being shown in phantom.

For example, a re-positioning of the stop links 42 within the upper brackets 46 rearwardly of the position depicted in FIG. 2 would result in an increase in the permissible vertical raising of the front wheel 13 if the front wheel 13 moves forwardly relative to the chassis 10, as the effective distance between the opposing upper and lower brackets 46, 47 would decrease, and a decrease in the permissible vertical raising of the front wheel 13 when the front wheel 13 moves rearwardly relative to the chassis 10. Such an oscillation characteristic could be desirable if the chassis 10 can accommodate greater amounts of vertical movement of the front wheel 13 forwardly of the straight ahead position, such as when the front wheel 13 is positioned by the pivotal movement of the front axle 12 forwardly of the front chassis member 17, but would impact chassis 10 structure when the front wheel 13 is moved rearwardly of the straight ahead position.

Referring now to all the FIGS., but particularly to FIG. 2, one skilled in the art will readily recognize that the engine E can be provided with a forwardly extending power-takeoff (PTO) shaft 50 to be operatively connected with an implement I positioned forwardly of the chassis 10 to provide operative power thereto. Both the front chassis member 17 and the front axle 12 are adapted with mounting bosses 52 to which forwardly positioned or front-mounted implements could be alternatively attached. By attaching a front-mounted implement to the front axle 12, the implement would pivotally move with the steering of the axle 12, as is described in greater detail in U.S. Pat. No. 5,299,821, issued on Apr. 5, 1994, to J. C. Hurlburt. In some situations, however, the implement would be best operable if mounted on the chassis, which would then not move laterally with the steering motion of the front axle.

Since the front chassis member 17 supports the radiator and other related structure thereabove through which the PTO shaft could not pass, the PTO shaft is routed from the engine E downwardly through an opening 18 in the rearward portion of the front chassis member 17. For the configuration of front-mounted implements attached to the front axle 12, the PTO shaft 50 must be free to swing from side to side with the steering movement of the front axle 12. Accordingly, the transverse width of the opening 18 is sufficiently large to accommodate the lateral movement of the PTO shaft.

Figure 3:
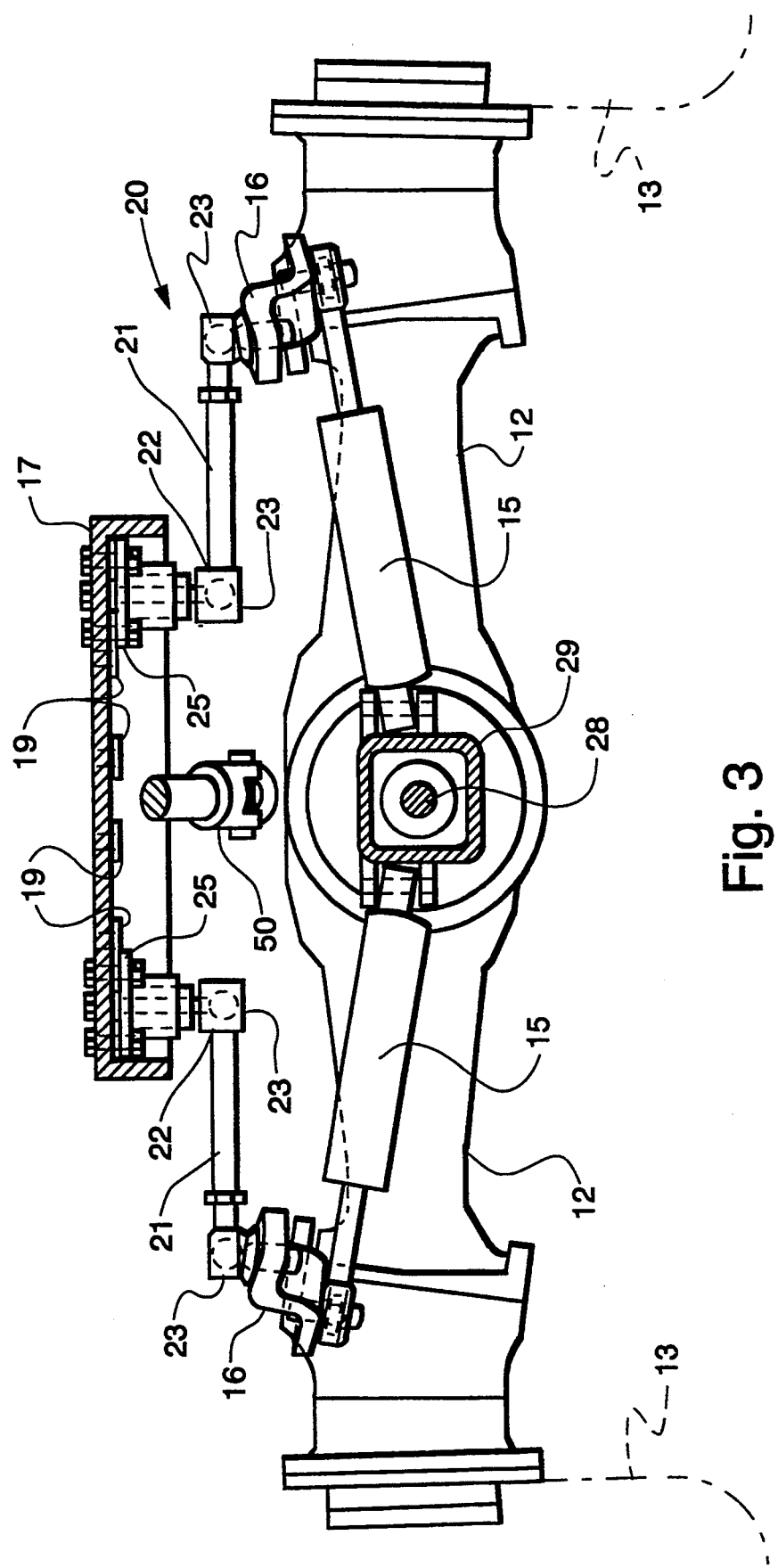
FIG. 3 is a cross-sectional view taken along lines 3—3 of FIG. 1 to better show the details of the tie rods and hydraulic steering cylinders, the tie rod mounting plates being positioned in their outboardmost position with a front power-takeoff shaft being utilized.

As best seen in FIG. 3, further clearance for the movement of the PTO shaft 50 can be obtained by relocating the tie rod mounting plates 25 outwardly with respect to the longitudinal centerline of the vehicle to the alternate mounting bosses 25. Because of the limited amount of vertical pivoting movement permitted by the structure of conventional tie rod ball joints 23, a greater amount of front axle rolling oscillation can be obtained when the tie rods 21 are normally oriented horizontally and kept as long as possible. The attachment of the mounting plates 25 at the inboardmost set of mounting bosses provides the least restriction to front axle rolling oscillation.

Figure 9:
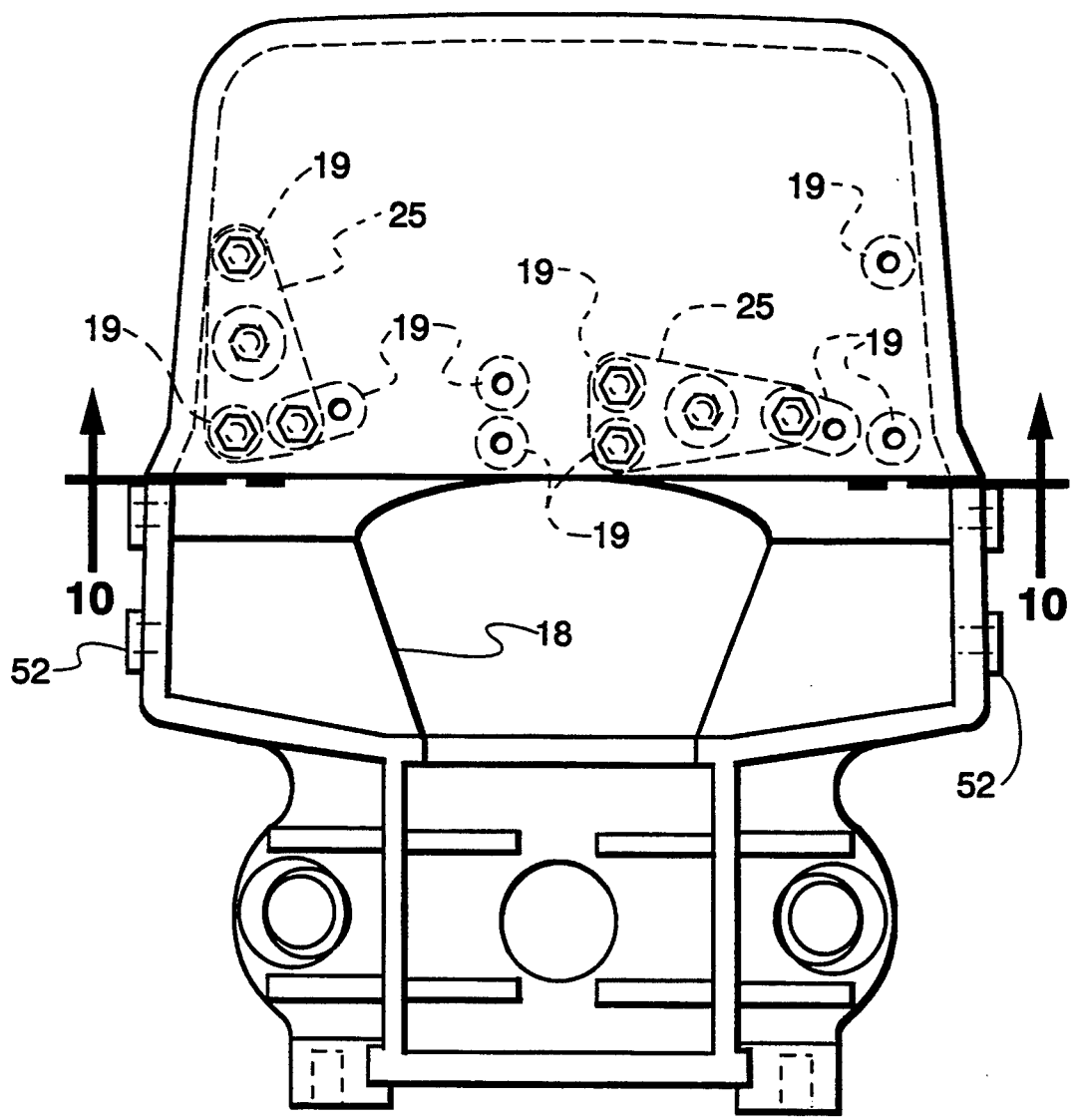
FIG. 9 is an enlarged detail view of the front chassis member to better depict the alternate mounting positions of the tie rod mounting plates shown in phantom, the left tie rod mounting plate being shown in the outboardmost position while the right tie rod mounting plate is shown in the inboardmost position, the related pivot mechanism and oscillation stop mechanism structure being removed for the purposes of clarity.
Figure 10:
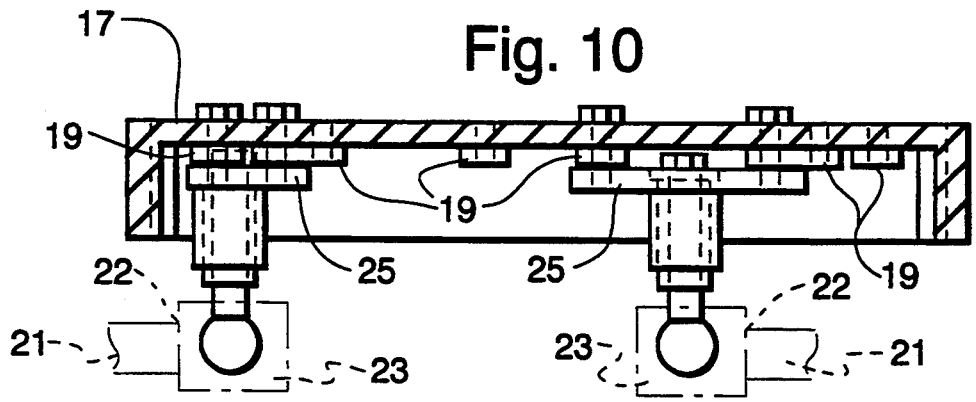
FIG. 10 is a partial cross-sectional view of the front chassis member taken along lines 10—10 of FIG. 9 to depict an elevational view of the tie rod mounting plates in their opposite respective positions.

By moving the tie rod mounting plates 25 to the outboardmost set of mounting bosses, shorter length tie rods 21 must be used, resulting in more severe vertical pivoting at the tie rod ball joints 23 for any given amount of front axle rolling oscillation. Greater clearance for the PTO shaft 50 can be obtained by an arrangement of the outboardmost set of mounting bosses 19 to orient the mounting plate 25 in a fore-and-aft direction, as shown in FIGS. 3, 9 and 10. When moving the inboard ends 22 of the tie rods 21 outwardly to the alternate chassis mounts, the required overall length of the respective tie rod 21 becomes shorter, which can be accommodated by an adjustable tie rod, such as the depicted configuration in which two halves of the tie rod are threadably engaged, or by replacing the tie rod 21 with a new tie rod 21 of proper length.

The trade-off for moving the tie rods 21 outwardly to provide adequate clearance for the swinging movement of the PTO shaft 50 is a more limited permissible rolling oscillation. Obviously, the operator is able to leave the tie rod mounting plates 25 at the inboardmost set of mounting bosses unless a front-mounted, PTO-driven implement is supported on the front axle 12 for lateral movement therewith, which in turn would require a lateral swinging movement of the PTO shaft and an adequate clearance for such motion. Nevertheless, whenever the tie rod mounting plates 25 are mounted on the outboardmost set of mounting bosses 19, the adjustment mechanism 45 should be manipulated to limit the amount of permissible rolling oscillation by the front axle 12 to a point below which the tie rod ball joints 23 would be damaged.

An alternative configuration of the pivots 32, 34 and 38 is shown in FIG. 7. The rearward pivot 38 is replaced by a thrust bearing 58 aligned with the oscillation axis 41 passing through the upper spherical pivot joint 32. The lower pivot joint 34 is replaced with a sleeve bearing 54 aligned with the steering axis 31 which also passes through the upper spherical pivot joint 32. Since the support link 35 is normally in tension while maintaining the longitudinal spacing of the lower pivot 34, 54 relative to the rearward pivot 38, 58, and since the support link 35 may not always be perpendicular to the steering axis 31, the sleeve bearings 54, 58 must be capable of resisting thrust. The lateral swinging movement of the lower pivot 34, 54 about the oscillation axis 41 is accommodated by the thrust bearing 58 and the spherical pivot joint 32. Likewise, the corresponding lateral swinging of the steering axis 31 will always have the sleeve bearing 54 aligned with the spherical pivot joint 32 to permit the front axle 12 to pivotally move about the steering axis 31.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A linkage for connecting a steering axle to a vehicle chassis comprising:

a spherical joint carried by said vehicle chassis and having a generally vertically extending steering axis extending therethrough, said steering axle being connected to said vehicle chassis at said spherical joint for movement relative thereto about said steering axis;

a first sleeve bearing carried by said vehicle chassis and being spaced rearwardly of said spherical joint, said first sleeve bearing being aligned with said spherical joint to form an oscillation axis;

a second sleeve bearing positioned below said spherical joint along said steering axis and forwardly of said first sleeve bearing, said second sleeve bearing being mounted for transverse movement relative to said spherical joint, said second sleeve bearing further being mounted so as to remain aligned with said spherical joint irrespective of the transverse position thereof relative to said spherical joint, said spherical joint and said second sleeve bearing defining said steering axis;

a support link operatively interconnecting said first and second sleeve bearings to maintain a predetermined longitudinal spacing therebetween, said second sleeve bearing being mounted at a forward end of said support link; and said support link allowing said transverse movement of said second sleeve bearing about said oscillation axis in response to rolling oscillations of said steering axle.

2. The linkage of claim 1 wherein said steering axle is operatively connected to a longitudinally extending drive shaft for powering a rotation of wheels mounted on opposing ends of said steering axle, said support link being positioned below said drive shaft to shield said drive shaft between said support link and said chassis.

3. The linkage of claim 2 wherein said support link has a rearward end carrying a bracket mounting said first sleeve bearing and being supported from said chassis.

4. The linkage of claim 3 wherein said first sleeve bearing is vertically spaced relative to said spherical joint.

5. The linkage of claim 4 wherein said second sleeve bearing is mounted in said steering axle.

* * * * *